(12) United States Patent
Lvovskiy et al.

(10) Patent No.: US 7,982,959 B1
(45) Date of Patent: Jul. 19, 2011

(54) HEAD-UP DISPLAY

(76) Inventors: Matvey Lvovskiy, Brooklyn, NY (US);
Ilya Lipkind, Mountain View, CA (US);
Ilya Lvovsky, Brooklyn, NY (US)

( * ) Notice: Subject to any disclaimer, the term of this patent is extended or adjusted under 35 U.S.C. 154(b) by 0 days.

(21) Appl. No.: 12/804,909

(22) Filed: Aug. 2, 2010

(51) Int. Cl.
*G02B 27/14* (2006.01)
*G02F 1/1335* (2006.01)
*H04N 7/00* (2011.01)

(52) U.S. Cl. .......... 359/630; 349/7; 349/9; 348/115

(58) Field of Classification Search .......... 345/7, 9; 348/115; 349/11; 359/630
See application file for complete search history.

(56) References Cited

U.S. PATENT DOCUMENTS

| | | | |
|---|---|---|---|
| 4,218,111 A | 8/1980 | Withringtom et al. | |
| 4,711,512 A | 12/1987 | Upatnieks | |
| 4,927,234 A | 5/1990 | Banbury et al. | |
| 4,977,401 A | 12/1990 | Sjoberg | |
| 4,994,794 A * | 2/1991 | Price et al. ............... | 345/7 |
| 5,210,624 A | 5/1993 | Matsumoto et al. | |
| 5,243,448 A * | 9/1993 | Banbury ............... | 359/13 |
| 5,302,964 A | 4/1994 | Lewens | |
| 5,684,634 A | 11/1997 | Rogers | |
| 6,272,404 B1 | 8/2001 | Amano et al. | |
| 6,392,812 B1 | 5/2002 | Howard | |
| 6,545,778 B2 | 4/2003 | Ono et al. | |
| 6,567,014 B1 | 5/2003 | Hansen et al. | |
| 6,747,612 B1 | 6/2004 | Knox | |
| 6,795,040 B2 * | 9/2004 | Kanamori ............... | 345/7 |
| 6,813,086 B2 | 11/2004 | Bignolles et al. | |
| 7,031,067 B2 | 4/2006 | Voloschenko et al. | |
| 7,034,778 B1 * | 4/2006 | Hahl ............... | 345/7 |
| 7,391,574 B2 | 6/2008 | Fredriksson | |
| 7,482,996 B2 | 1/2009 | Larson et al. | |

* cited by examiner

*Primary Examiner* — David N Spector

(57) ABSTRACT

A novel HUD (Head-UP Display) design in which the image forming source producing flight and aiming symbolic information is based unlike conventional HUDs not on projecting CRT, but on two LCD matrices to reduce its size, weight and power consumption. The images produced on matrixes are projected by optical system on transparently-diffusive or diffusively-reflective screen which is positioned in focal plane of HUD's optical collimating head. To enhance HUD brightness and resolution the image forming source is carried out in two variants:
- image forming source containing two matrices in which each matrix is forming half of full image which is projected on corresponding half of the screen,
- image forming source containing two matrices which images are projected on full screen; the matrices are shifted between each other horizontally and vertically by half of pixel pace (pace is the distance between two luminous dots).

7 Claims, 3 Drawing Sheets

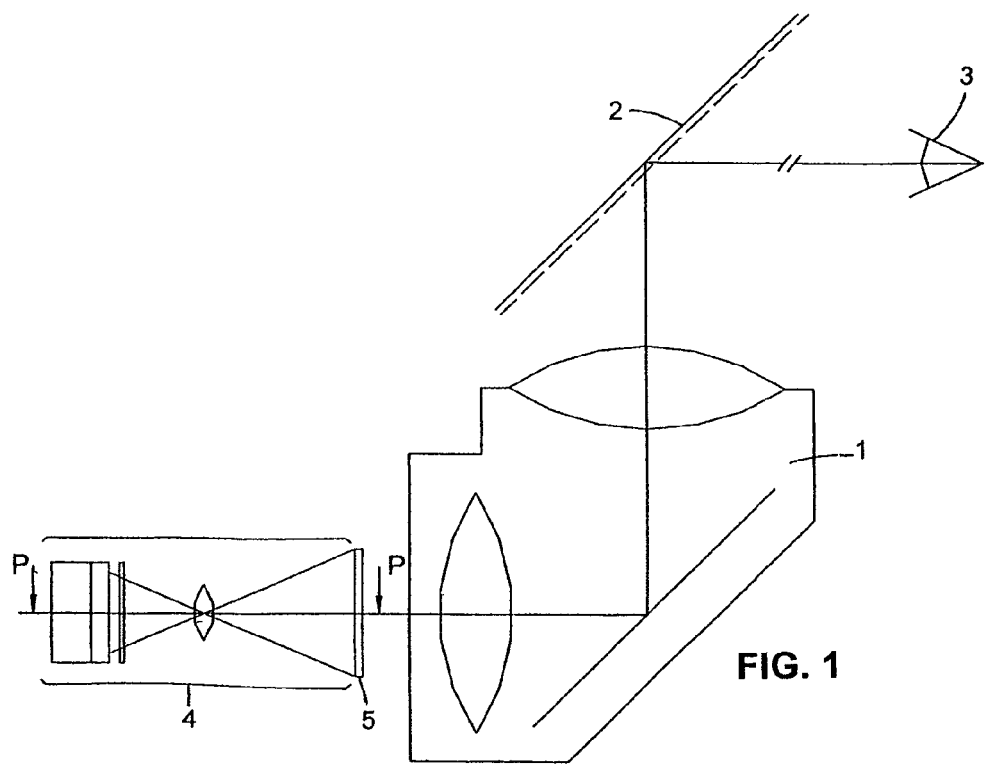
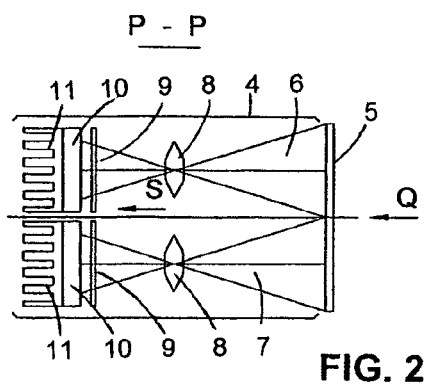
FIG. 2
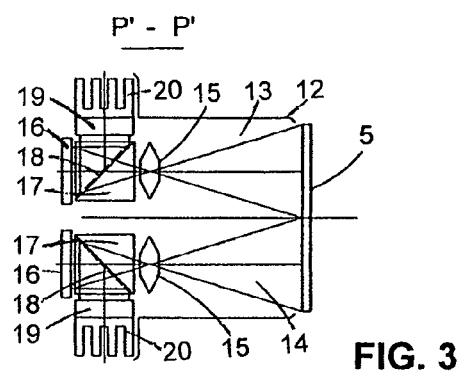
FIG. 3
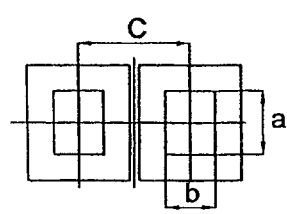
FIG. 4
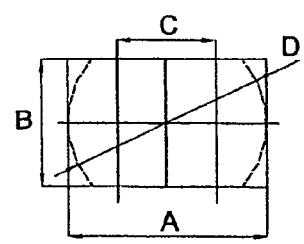
FIG. 5

HEAD-UP DISPLAY

BACKGROUND OF THE INVENTION

The offered Head-UP Display—HUD is intended for flight, navigation, and other parameter presentation on the windshield of aircrafts. Current HUDs utilize wide-angle collimating optical systems and possess great informational resources. HUD forms symbolic images of above-mentioned parameters in its field of view and projecting them to pilot's sight of view into optical "infinity". These symbolic images are then overlaid on the "real world" picture.

Practically all known HUDs are built the same way and are made up of two rigidly connected parts: an image forming source and collimator optical system. In the patent literature the most frequently described HUDs are the ones where the image forming source is based on a monochromatic projecting CRT (PCRT) with its screen located in the focal plane of the collimator optical system. This high intensity monochromatic PCRT has a relatively high resolution provided by the deflecting and focusing systems, deflection amplifiers and the light amplifier with their inputs connected with symbols generator or integral display system on-board computer according with the signals of which the symbolic data (counters, indices, etc.) is represented on the screen by an electronic beam. To provide high symbol brightness sufficient for the required contrast to be used under the high intensity and ambient lighting conditions, the CRT's electronic beams operated by use of a functional-vector method which provides significantly lower beam velocity during scans than with TV raster representation.

The HUDs described in patents U.S. Pat. No. 4,997,401, U.S. Pat. No. 6,392,812, U.S. Pat. No. 6,567,014 are built by a similar scheme.

The reviewed HUDs based on projecting CRT have significant drawbacks such as the following;

High voltage power supply 15-20 KV is required;

CRT extended electron gun with electrostatic or magnetic focusing is required to provide high brightness and resolution. As a result, the CRT's total length becomes 200-240 mm that makes the rear part of the HUD frame to be extended. As the HUD's rear is positioned behind the instrumental panel, the extremely restricted board space is used inefficiently and instrumental equipment weight is increased.

Limited acceptable beam power density caused by luminofor destruction and focusing system resources excludes the CRT performance improvements. The resolutions of the current CRTs are 10-15 line/mm max for TV-raster mode.

To operate the electron beam by functional-vectorial method powerful DC amplifiers and output transistors are required which need to be cooled by use of bulky and heavy radiators;

Strong power supply is required for deflection amplifiers usually arranged directly inside of HUD, thus increasing size and weight.

To form the image (for example radar or infrared) via a TV-Raster method, the sufficient power supply is required for the deflection amplifiers operation. The specified supplied power is several times more than that of deflection amplifiers supplied power that is required for symbolic images forming by use of functional-vectorial method.

Unstable operating of CRT analog control system caused by outer factors such as temperature, power supply and parameter variations affects the accuracy of aiming data presentation in HUD field of view and therefore it's necessary to introduce an automatic correction schema into the HUD to compensate for the errors caused by above mentioned instability;

To compensate CRT and CRT control system electronic errors which cause angular errors of symbols location the CRT control system is supplemented with an arrangement comprising of adjustable resistors and other electronic components. The process of simultaneous elimination of electronic errors and optical errors caused by optical system distortion is extremely laborious work which is carried out at the production department in the majority of cases.

The HUD disclosed in U.S. Pat. No. 7,482,996 is an example of LCD matrix application as the image forming source. All the main features mentioned in the patent utilize various peculiarities of the polarized light which forms the information picture ("first image") on the ambient background ("second image") with natural circular polarization. Actually such approach allows to get a level of enhanced image brightness and contrast that is comparable with similar parameters attained for HUDs based on holographic optical elements and projecting CRT.

At the same time the HUD by U.S. Pat. No. 7,482,996 based on an LCD matrix possesses significant shortcomings caused by limited resolution of the LCD matrix and point structure of image formulation. Therefore the disruptions and "teeth" that are occurring during symbols scans and the symbolic information image is of significantly lower quality than the image formed by the HUD based on CRT, in particular with HUD large fields of view. The offered HUD based on the new conceptual model makes it feasible to eliminate the above-mentioned defect inherent in the display as disclosed in U.S. Pat. No. 7,482,996 and further allows to eliminate or reduce the drawbacks and limitations of the current HUD, based on the CRT, as specified above.

SUMMARY OF THE INVENTION

Disclosed HUD whereas high resolution LCD matrix is utilized for image forming source instead of a CRT. To provide required resolution and brightness for the information picture image to be presented by the HUD under intensive and ambient light conditions, the image forming source is carried out with two LCD matrices.

To achieve the image of high quality and brightness for offered HUD, the image forming source could be carried out in two variants:

each LCD matrix represents the image on a half of HUD's field of view;

both LCD matrices represent the images on the full HUD's field of view providing that matrices are shifted between each other vertically and horizontally by half of the matrix pixel pace.

Taking into account the technological production capabilities and availability of LCD matrices which provide the required performance and the other factors (such as cost, etc), the LCD matrices of two types such as transmitting and reflective to be used in HUD under consideration are offered. Several variants for the image forming source realization are proposed respectively.

To provide the image forming sources based on LCD matrices compatibility with current wide-angular optical collimating heads, the image forming sources are carried out with image projection on the intermediate transparently-diffusive or diffusively-reflective screen introduced into the collimating optical system and placed in its focal plain providing that the screen diameter conforms to active area of the projecting CRT screen.

BRIEF DESCRIPTION OF THE DRAWINGS

Detailed description of the present invention is followed by reference to the accompanying drawings in which similar elements are indicated by similar references and numerals.

FIG. 1 shows the block-diagram of the presented HUD based on two matrices.

FIG. 2 shows The image forming source consisting of two transparent LCD matrices which is provided with transparent-diffusive screen and each matrix is forming the image on the corresponding half of the screen.

FIG. 3 shows the image forming source consisting of two reflective LCD matrices and provided with transparent-diffusive screen with each matrix representing the image on the corresponding half part of the screen.

FIG. 4 shows the mutual arrangement of matrices with a and b margins of the active area with their centers shifted between each other by distance c which is equal to half of screen diameter.

FIG. 5 shows two matrices providing the image forming for HUD full angular field of view with the image size corresponding to A horizontally and B vertically.

DETAILED DESCRIPTION OF PREFERRED EMBODIMENT OF THE INVENTION

Figure 6:
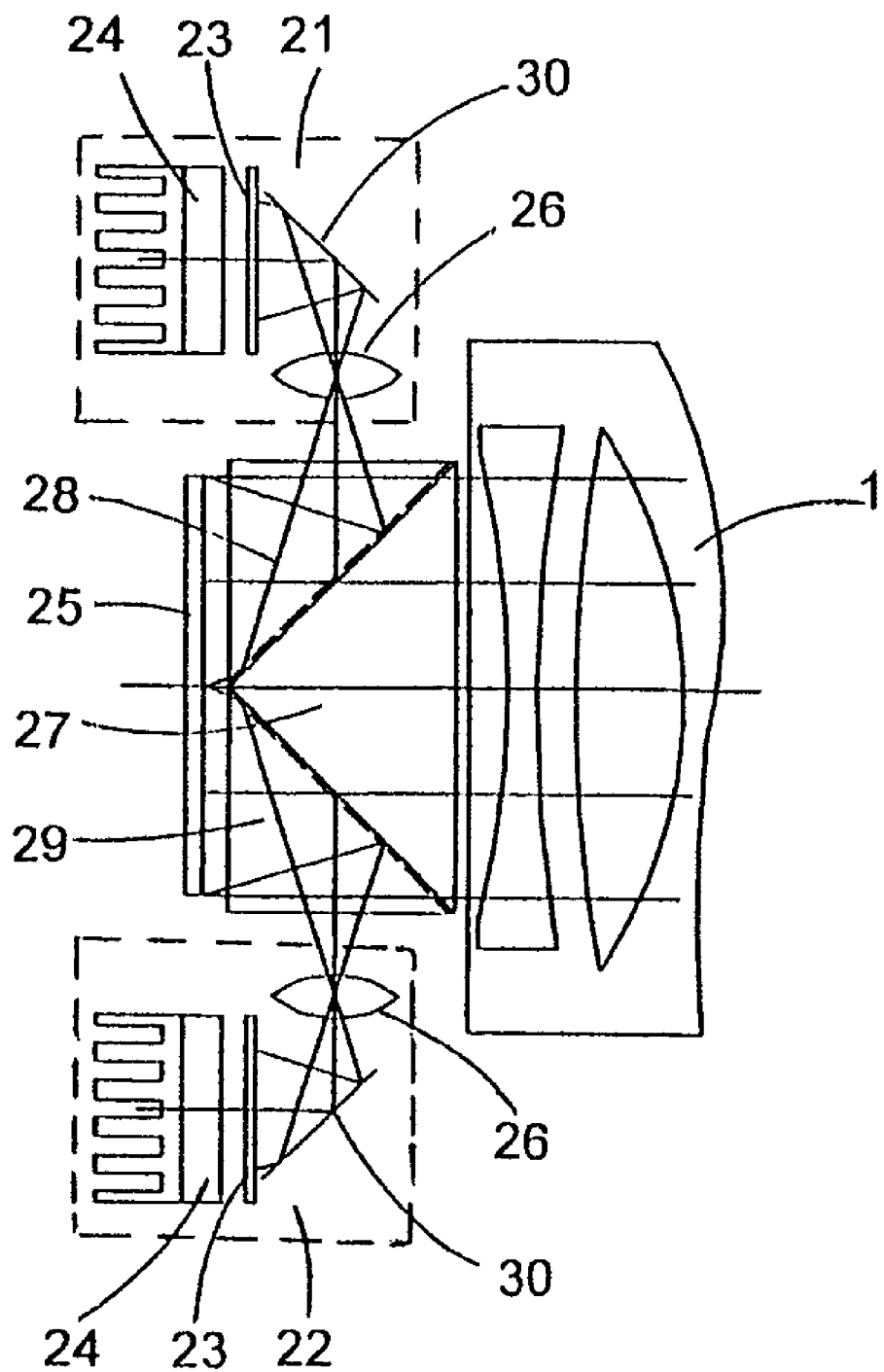
FIG. 6 shows the image forming source comprising of two transmitting LCD matrices which is equipped with diffusive-reflective screen with each matrix representing the image on the corresponding half of the screen.

FIG. 1 shows the block-diagram for HUD with image forming source based on two matrices which represent symbolic and other information 4. The intermediate transparent-diffusive screen 5 is placed in focal plane of optical collimating head 1 on which the projecting lens projects the images generated by the matrices. The information presented on the screen 5 can be seen by the pilot 3 in optical infinity simultaneously with the "real world" picture by use of semi-transparent mirror 2. Collimating of imaged parameters required for special flight control and combat tasks and their superimposing with the "real world "picture allow avoiding lapses of time required for pilot's eyes re-accommodation and re-adaptation while maintaining visual contact with the aircraft's instrument panel in order to get the required information and high illuminated "real world" "picture.

FIG. 2 shows the suggested image forming source based on transparent LCD matrices. The image forming source contains two similar visualizers: 6 and 7 positioned in symmetrical relativity to the vertical plane of the collimating head as shown on section P-P. Each visualizer contains a projecting lens 8, a transparent LCD matrix 9 and a LED (light emitting diode) lighter 10 with cooler 11.

FIG. 3 shows the image forming source which is based on reflective matrices 12. In this case the cubiform prism 17 with light dividing element 18 is positioned between lens 15 and matrix 16 and LED lighter 19 with cooler 20 is positioned in front of the prism's input side 17 for each visualizer.

Current wide-angle collimating optical systems form the angular field of view as a circle of 30° diameter with its upper and lower segments cut off to 22°-24° (taking into account features of binocular monocular vision) with angular field of view corresponding to PCRT diameter D. In offered HUD to provide more effective application of matrices 6 with their sides ratio a:b=4:3 (see FIG. 4), each matrix is positioned with its short side b horizontally. At the same time the centers of matrices are positioned symmetrically in relation to optical axis of collimating head with the distance between each other C=½ A with A representing horizontal size of the screen which is equal to PCRT diameter D (FIG. 5). The projecting lens 8 magnification W=0.5 A/b whereas each matrix forms the image on the half of the screen. With such magnification, two images are formed on the screen 2 with their uplinks coinciding with symmetry axis. To eliminate the loss of information the images are adjoined by several overlapping pixels.

The benefit of the application of two matrices in image forming source is a significantly higher image resolution as compared to the projecting CRT. The application of LCD matrices with active diagonal area 0.5"-1.0" and the resolution of 1024 pixels along the matrix's short side provides not less than 40 lines/mm resolution of the screen whereas the projecting CRT provides almost three times less resolution for TV-raster mode. The resolution of matrices is still increasing owing to microelectronics advancement whereas the physical limit for the projecting CRT is practically maxed out.

As for light parameters of image forming source based on LCD matrices 9 (FIG. 2) with LED 10 of super high brightness available for matrices illumination, and given parameters of transparent-diffusive screens 5, with the total brightness for the screen being comparable with projecting CRT brightness and is attainable currently by use of two LCD matrices. The development of special screen 5 with optimal light transmission and light diffusion indicatrices makes it possible to achieve brightness which is exceeding that of CRT brightness.

FIG. 6 shows the other variant of image forming source consisting of two The image forming source contains two similar visualizers 21 and 22 with transparent LCD matrices 23 with a LED lighter 24 and provided with diffusive-reflective screen 25 with each matrix presenting the image on corresponding half of the screen.

The prism element 27 containing two inclined light dividers 28 and 29 is positioned between the diffusive-reflective screen 25 and projecting lens 26 for the image to be presented on the screen-25 and viewed via collimating head 1. Moreover the inclined mirrors 30 are positioned between the projecting lenses and matrices so as to change the axis direction and therefore diminish the transverse size of image forming source.

The mutual adjustment of matrices is carried out together with the screen during the mechanical assembly of image forming source with two visualizers. The assembling technology makes feasible to combine the edges of images turned to each other with high accuracy overlap of 2-3 pixels. The precise adjustment is attainable by image re-projection from screen 5 (FIG. 2, FIG. 3) or screen 25 (FIG. 6) to the large-scale screen and visual supervision of assembling process or by use of optical magnifiers (microscopes for example) to watch the screen 5 or 25.

Besides the reviewed variants of image forming source design with each matrix projecting the image on the half of the screen the image forming source design variant is proposed in which the image generated by matrices is projected onto a full screen. To provide more effective utilization of matrices they are positioned with their long sides horizontally and shifted between each other vertically and horizontally by half of the space between two illuminated dots (pixels) on the matrix.

The binding of image forming source to a coordinate system in presented HUD is carried out automatically with electronic correction of the image by use of special program inserted into software of the onboard computer by which HUD is operated. The pixels are aligned with the HUD's optical axis and are set by the program as zero of the rectangular coordinates system and the location of each pixel for both LCD matrices and accordingly, the coordinates of image elements generated in HUD field of view is calculated from the central (zero) pixel. As LCD matrices are rigid structures the central pixel always preserves its angular location in HUD. This is practically impossible with the PCRT application because of inevitable temporal drift of PCRT parameters and its control system. Therefore a special electronic arrangement and optical arrangement forming the image of marker bound to HUD's optical axis is introduced into the HUD. Based on PCRT and by use of these arrangements manual or automatic shift correction is carried out for the central beam which is to be constantly aligned with the HUD's axis.

Figure 7:
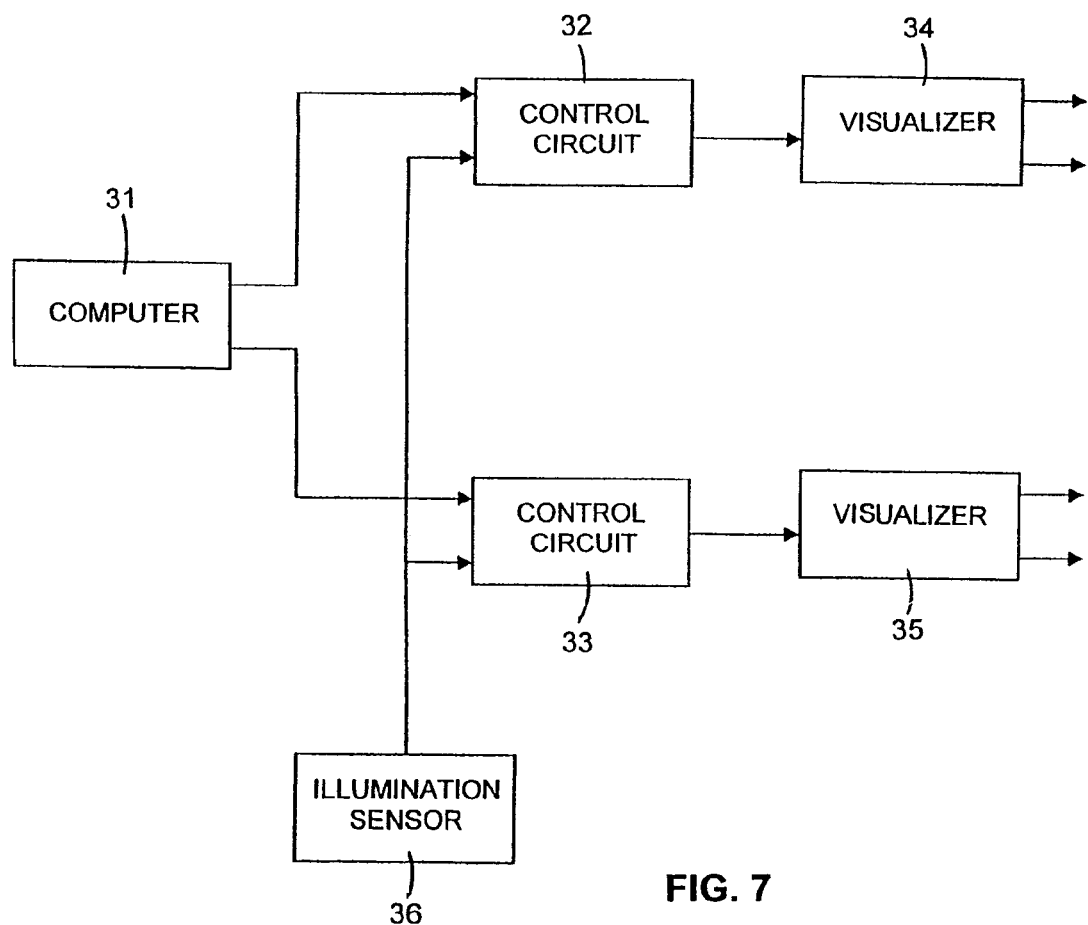
FIG. 7 shows the HUD interaction with the onboard computer of aircraft integral display system.

FIG. 7 shows the scheme of HUD interaction with the onboard computer of an aircraft display system. According with specified flight or combat task the computer 31 output digital signal enter the inputs of visualizers 34 and 35 control devices 32 and 33 of HUD image forming sources and by use of these signals the symbolic images (monochrome or color) are displayed on matrices 9 (FIG. 2) and further projected on the screen 5. The output signal of ambient light luxmeter-sensor 36 enters the HUD input and therefore the automatic brightness adjustment is provided for the image to be seen by pilot in HUD's field of view. Thus favorable conditions are provided for pilot under different ambient light conditions (day or night).

ADVANTAGES OF THE INVENTION

Using maximum light efficiency provides twice as high resolution of matrices whereas the presented HUD is based on two LCD matrices making it possible to develop the display with similar or superior image brightness by several times exceeding the resolution compared to conventional HUD with PCRT.

The presented image forming system for symbols generation is based on two LCD matrices and provides considerably decreased HUD size and weight as bulky and power intensive CRT control system application is not required. The application of devices for detecting and eliminating the CRT control systems instability affecting the HUD accuracy is also no longer required.

The benefits of the offered HUD are ease of manufacturing and high reliability in stability of operation. The module and interchangeability design of matrices control devices enables to replace them under operating conditions that is a great benefit whereas for HUD based on CRT the maintenance under factory conditions is often required.

The proposed wide choice of options for various HUD design versions to be selected allow the developer to choose the optimal version taking into account the special features of the object where the HUD is scheduled to be installed as well as manufacturing capabilities.

The wide range availability of miniature matrices, high intensive LEDs for matrices illumination, high-power lens and optical materials support the LCD based HUD development.

The intermediate screen which is imposed into image forming source design for proposed HUD, the characteristics of which is similar to PCRT characteristics makes it possible to upgrade the wide-angular HUD installed on the state-of-the art fighters by replacement of image forming sources based on PCRT with the proposed image forming source. The image forming sources replacement could be carried out both in operation or during an aircraft upgrade in order to improve its combat potential and to extend its service time.

It's worthy to note, that the linear polarization existence in LCDs is not an obstacle to be applied in a presented HUD instead of CRTs. In this case, in order to enable the rotation of the light polarization plane and enhance brightness, additional optical arrangements for adjustment are introduced into image forming source which are positioned at the LCD matrix output.

What is claimed:

1. A Head-Up Display consisting of an optical collimating system; and a graphical image forming system forming graphical images from symbology and pictorial information generated therein, wherein the image forming system includes two visualizers, each visualizer comprising an LCD matrix containing a two-dimensional array of pixels, LED light sources and a projection lens, and wherein the images formed by the two LCD matrices are projected by the projection lenses onto an intermediate screen disposed in a focal plane of the collimating optical system.

2. The Head-Up Display according to claim 1 wherein the intermediate screen is a transparent-diffusive screen with a transverse dimension corresponding to a field of view of the collimating optical system.

3. The Head-Up Display according to claim 1, wherein the LCD matrices are disposed between the LED light sources and the projection lenses.

4. The Head-Up Display according to claim 1 wherein the LCD matrices rectangular, having a short dimension and a long dimension.

5. The Head-Up Display according to claim 1 wherein the short dimensions of the LCD matrices are oriented horizontally.

6. The Head-Up Display according to claim 1 wherein images from each of the two visualizers are projected onto two regions of the intermediate screen, wherein each of the two regions occupies approximately an opposite one-half of the intermediate screen with an overlap corresponding to several pixels from each the LCD matrices.

7. The Head-Up Display according to claim 1, further satisfying the relationship M=D/2a, wherein M is a magnification of the projection lens included in each visualizer, D is the length of the intermediate screen in a transverse dimension and a is the length of the LCD matrices, in the short dimension.

* * * * *